United States Patent [19]
Friday

[11] 4,254,608
[45] Mar. 10, 1981

[54] TREE SHAKING APPARATUS

[75] Inventor: Philip L. Friday, Hartford Township, Van Buren County, Mich.

[73] Assignee: Friday Tractor Co., Inc., Hartford, Mich.

[21] Appl. No.: 26,245

[22] Filed: Apr. 2, 1979

[51] Int. Cl.³ .......................................... A01D 46/00
[52] U.S. Cl. ................................................ 56/328 TS
[58] Field of Search ................................... 56/328 TS

[56]  References Cited
U.S. PATENT DOCUMENTS

| | | | |
|---|---|---|---|
| 3,021,168 | 2/1962 | Bodine | 56/328 TS |
| 3,120,091 | 2/1964 | Gould et al. | 56/328 TS |
| 3,460,329 | 8/1969 | Overstreet, Jr. | 56/328 TS |
| 3,485,025 | 12/1969 | Bohannon | 56/328 TS |
| 3,504,486 | 4/1970 | Fridley | 56/328 TS |
| 3,537,246 | 11/1970 | Pool et al. | 56/328 TS |
| 3,548,578 | 12/1970 | Shipley, Jr. | 56/328 TS |
| 3,596,972 | 8/1971 | Pool | 56/328 TS |
| 3,762,139 | 10/1973 | Tompkins | 56/328 TS |
| 3,771,301 | 11/1973 | Favor | 56/328 TS |
| 3,780,510 | 12/1973 | Tompkins | 56/328 TS |
| 3,793,815 | 2/1974 | Hughes | 56/328 TS |

Primary Examiner—Paul J. Hirsch

[57] ABSTRACT

A tree trunk-type shaking apparatus, for vibrating a tree to effect harvesting of fruit or nuts, including a fixed trunk-engaging jaw and a pair of relatively movable, vibratable, trunk-engaging jaws. The three jaws are arranged so that they can surround a tree trunk and contact same over almost the entirety of the periphery thereof. Vibration of the two vibratable jaws while in contact with the tree trunk will shake the tree trunk and thereby dislodge the ripe fruits or nuts therefrom.

9 Claims, 4 Drawing Figures

TREE SHAKING APPARATUS

FIELD OF THE INVENTION

This invention relates to a tree trunk shaking machine having three jaws for surrounding a tree trunk and imposing a vibratory force on the tree trunk for carrying out nut and fruit harvesting operations.

BACKGROUND OF THE INVENTION

Tree shaking machines utilizing vibrating jaws for imposing a vibratory force on tree trunks have been in use for many years for harvesting fruit and nuts. Various types of tree shaking machines have been developed for this purpose, which machines are structurally different in many ways, for example, as to the manner in which the vibration force is achieved and as to the manner in which the machine engages the tree.

Trunk-type tree shakers generally involve the use of a pair of clamping jaws which are adapted to engage the trunk of the tree to cause vibration of the entire tree. Tree shakers of this latter-mentioned type have generally utilized one nonvibratable jaw and one vibratable jaw which uses a vibrator employing one or more rotating weights which are effective in developing either a rapidly reciprocating or gyratory force, which force is transmitted to the trunk of the tree for dislodging the fruit or nuts. While the known trunk-type tree shakers have been effective in harvesting the fruit, they have been less than completely satisfactory because they cause undesirable damage to the tree, particularly because they damage the tree bark.

This disadvantage experienced with known trunk-type tree shakers appears to result from the way in which the jaws engage the tree trunk. The repetitive vibratory force patterns, which repetitive patterns may involve either the generation of a rapidly reciprocating vibratory force or the generation of a rapidly rotating gyratory force, cause the jaws to rub on the bark of the tree. Further, the mass and size of the trunk necessarily requires that the vibration force be of substantial magnitude in order to result in sufficient vibration of the tree limbs to remove the fruit or nuts. In many situations, the magnitude of the vibration force necessary to cause removal of the fruit is also sufficient to cause damage to the tree, particularly to the bark thereof.

U.S. Pat. No. 3 460 329 discloses a tree trunk shaker having three pivotally mounted pads for engaging the tree trunk at three circumferentially spaced locations. Two of the pads are mounted on pivoted arms each containing a vibration mechanism so that the tree trunk can be shaken. The pivotal mounting of the pads is undesirable because of the possibility of breakage. Also, the possibility of bark damage exists because the jaws contact circumferentially widely spaced-apart zones of the tree trunk so that relative circumferential movement between the pads and the trunk can readily occur.

Accordingly, it is an object of the present invention to provide a trunk-type tree shaker for harvesting fruits and nuts and which overcomes the above-mentioned disadvantage.

It is a further object of the present invention to provide a tree trunk shaker, as aforesaid, which utilizes a fixed jaw and two relatively movable, vibratable jaws which are arranged to encircle the tree trunk and to contact same over almost the entire circumference thereof.

A further object of the present invention is to provide a tree trunk shaker, as aforesaid, in which the jaws comprise resiliently compressible and deformable, hollow, tree trunk-engaging pads so that when the jaws are clamped on the tree trunk, the pads are deformed into snug contact with the tree trunk substantially completely encircling same and contacting same over a major portion of the circumference thereof.

It is also an object of the present invention to provide a tree trunk shaker, as aforesaid, which can be easily attached to or removed from the tree trunk, which can be easily moved about in an orchard, and which will operate efficiently for long periods of time while requiring a minimum of maintenance.

These and other objects of the present invention will be apparent to persons acquainted with devices of this type upon reading the following description and inspecting the accompanying drawings.

SUMMARY OF THE INVENTION

The objects and purposes of the present invention are met by providing a fruit and nut harvester having a trunk-type shaking apparatus for vibrating a tree trunk to effect harvesting of the fruit or nuts. The shaking apparatus includes a fixed jaw and a pair of movable vibratable jaws adapted to clampingly engage the trunk of a tree. The vibratable jaws are connected to vibrator mechanisms whereby vibration forces are imposed directly on the tree trunk. In the trunk-clamping position of the jaws, the trunk is substantially completely encircled by the jaws and is contacted over the major portion of its circumference by the surfaces of elastically deformable pads. The pads are preferably hollow tubes made of elastomeric material whereby they can be deformed to conform to the curvature of the zones of the tree trunk that they contact and so that they can be deformed at the locations where they contact each other.

DETAILED DESCRIPTION

Figure 1:
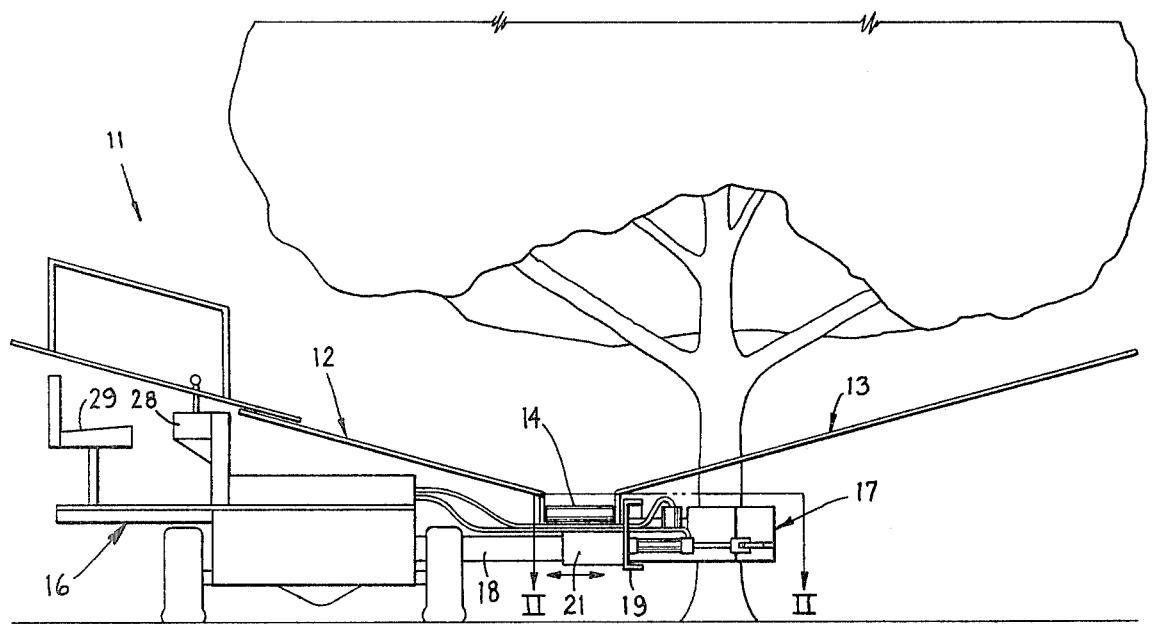
FIG. 1 is an elevational view illustrating the manner in which a fruit harvester having a catching frame thereon is disposed relative to a fruit tree for catching and collecting the fruit which falls from the tree.

FIG. 1 illustrates a fruit harvester 11 adapted to be used in conjunction with a fruit tree for effecting harvesting of the fruit or nuts on the tree. The fruit harvester 11, in the disclosed embodiment, includes a catching apparatus 12 which comprises a rigid frame having supported thereon a flexible curtain, which curtain is inclined relative to the horizontal direction and is adapted to be disposed under the tree for collecting the falling fruit. The catching apparatus 12 as illustrated in FIG. 1 is adapted to extend under approximately one-half of the tree. A similar catching apparatus 13 is adapted to be disposed under the other half of the tree whereby the fruit that falls on the apparatuses 12 and 13 will then slide down the flexible curtains into a conveyor 14 located at the juncture of the two catching apparatuses for permitting the collected fruit to be deposited into suitable receptacles. The catching frame 13 is designed to be folded to permit the size thereof to be substantially reduced to permit the harvester 11 to be easily moved about. Although FIG. 1 illustrates one typical known type of fruit catching apparatus, it will be understood that the invention can be used with any suitable catching apparatus. For example, there can also be used the so-called half-rollout type of fruit catcher wherein rollout carpets are used to catch the fruit, as shown, for example, in U.S. Pat. No. 3,511,039. The structures and modes of operation of the fruit catching apparatuses are well known and thus further description thereof is not believed necessary.

The harvester 11 comprises a tractor 16 for supporting the catching apparatus 12, the conveyor 14 and a shaker mechanism 17. A pair of supports 18 extend sidewardly from the frame of the tractor 16. The shaker mechanism 17 comprises a main frame member 19 having a pair of sleeves 21 projecting sidewardly therefrom and slidably sleeved on the ends of the supports 18. The piston rod 23 of a double-acting, fluid pressure piston and cylinder unit is pivotally connected to the main frame member 19 and the cylinder 24 thereof is supported on the tractor 16. Thus, the shaker mechanism 17 can be moved laterally toward and away from a tree by supplying fluid pressure to the cylinder.

The tractor 16 carries a main pressure pump, which pump suitably pressurizes a pressure fluid, particularly a hydraulic fluid, as supplied to the pump from a reservoir. The flow of pressurized fluid from the pump is controlled by means of a control panel 28 on the tractor, which control panel has a plurality of manually movable levers associated with conventional control valves (not shown) for controlling the flow of pressurized fluid to the various driving devices contained on the harvester. The harvester also includes a seat 29 disposed adjacent the control panel 28 for permitting an operator to be positioned closely adjacent the control panel for manipulation of the control valves.

The main frame member 19 of the shaker mechanism 17 supports a fixed jaw 31 and two movable jaws 32 and 33. The fixed jaw 31 is centrally located between the two movable jaws 32 and 33. The fixed jaw 31 comprises a mounting block 34 having a pad and liner assembly 36 mounted thereon. The fixed jaw 31 is stationarily mounted on the main frame member 19 and faces in a direction away from the tractor for engagement with a portion of the circumference of the tree trunk T, as shown in FIG. 2.

The movable jaws 32 and 33 each comprise a housing 37 connected to an arm 38 which arm is pivotally mounted on the main frame member 19. The piston 39 of a double-acting, fluid pressure operated piston and cylinder unit is pivotally connected to a lug 41 projecting laterally from the housing 37 and the cylinder 42 thereof is pivotally mounted on the main frame member 19. Thus, supply of pressure fluid to the cylinders 42 is effective to move the movable jaws 32 and 33 between their mutually adjacent positions, as shown in FIG. 2, and their mutually remote positions as shown in FIG. 3. The operator controls the supplying of pressure fluid to the cylinders 42 by manipulation of a lever on the control panel 28.

The housings 37 of the movable jaws 32 and 33 each contain mechanism for effecting vibration of the movable jaws. The vibration mechanism can be of any conventional type used for trunk shaking purposes. One typical vibrating mechanism comprises one or more eccentric weights 40 disposed inside the housing 37 and rotatably supported on a vertical shaft 43 for rotation about a vertical axis. The shaft 43 is rotated by a rotatable hydraulic motor 44 mounted on the housing 37 of the movable jaw. The hydraulic motor 44 drives a gear which is coupled by a chain 45 to a gear on the shaft 43. Supply of pressure fluid to the motors is controlled by manipulation of levers on the control panel 28. The rotary hydraulic motors 44 can be independently controlled and they can be variable speed motors whereby the intensity and pattern of vibrating force applied to the tree is variable in a wide range.

Figure 2:
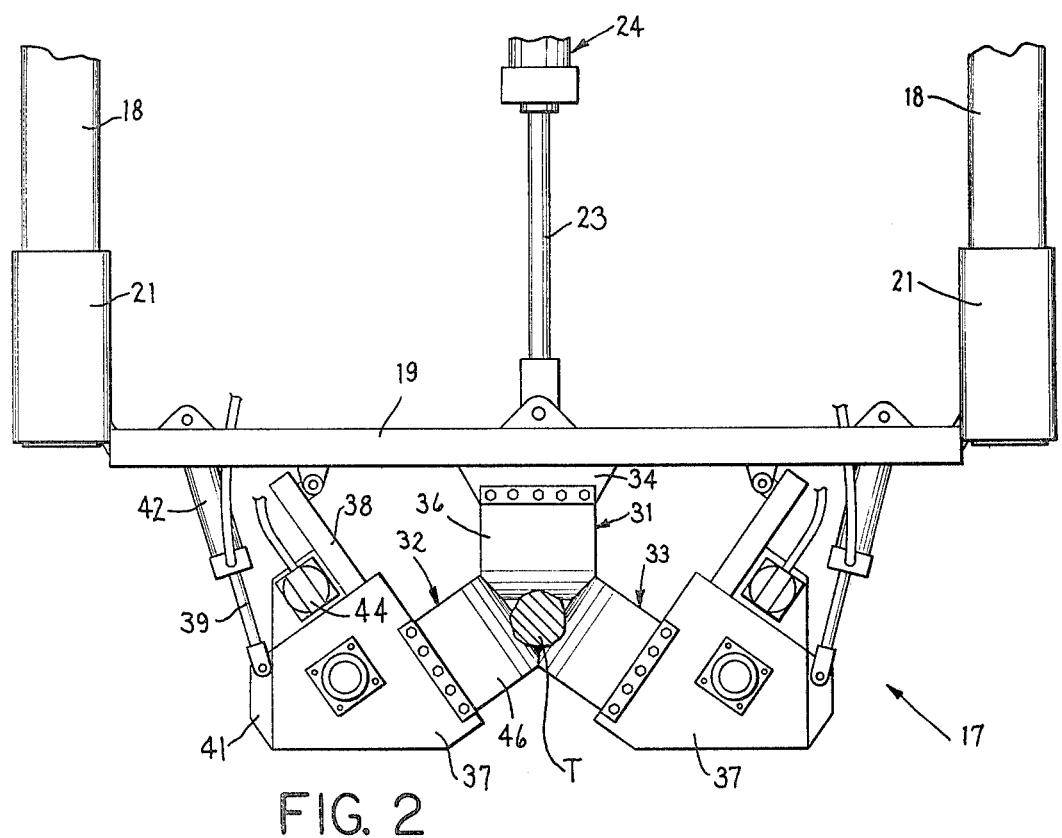
FIG. 2 is a sectional view taken along the line II—II in FIG. 1.
Figure 3:
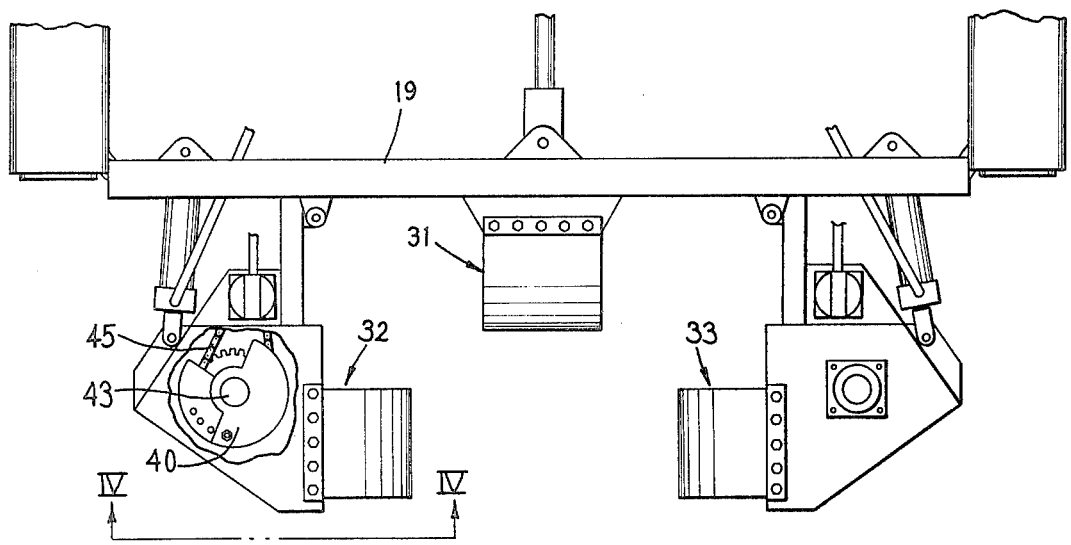
FIG. 3 is a view like FIG. 2 and showing the jaw mechanism in the open position free from engagement with a tree trunk.

Pad and liner assemblies 46 are mounted on the opposing surfaces of the housings 37 of the movable jaws 32 and 33 so as to face each other in the open position of the movable jaws (FIG. 3) and to define with the pad and liner assembly 36 of the fixed jaw 31 a substantially triangular cavity encircling the tree trunk T in the closed position of the movable jaws (FIG. 2).

Figure 4:
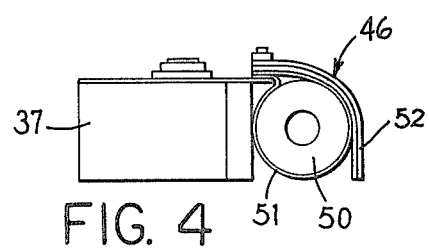
FIG. 4 is an elevational view of a single jaw, taken along the line IV—IV of FIG. 3.

In the preferred illustrated embodiment of the invention, as shown in FIG. 4, the pad and liner assemblies 36,46,46 are each comprised of a thick-walled tube 50 made of an elastomeric material such as natural rubber, synthetic rubber or elastomeric synthetic resin. The tube 50 is supported in a sling 51 which is fixedly secured to the housing 37 in the case of assemblies 46,46, and in the mounting block 34 in the case of assembly 36. The tube 50 can be deformed in both the lengthwise and radial directions so as to conform closely to the shape of the portion of the circumference of the tree trunk that it contacts. A liner 52 is made of one or more sheets of flexible belt-like material. The upper edge of the liner 52 is secured to the upper wall of the housing 37 in the case of the assemblies 46,46, and to the upper wall of the mounting block 34 in the case of assembly 36. The liner 52 extends downwardly across the upper portion of the face of the tube 50 and is located between the tube and the tree trunk so that the liner actually contacts the tree. The liner 52 is preferably made of a material which is resistant to chemicals, grease and weather and which has low sliding friction with the tube 50 or is surface treated so as to have that property. The sliding friction can be further reduced by greasing the mutually adjacent contacting surfaces of the pad and liner. The material of the tubes 50, while possessing sufficient elastic deformation for clamping the trunk, nevertheless possesses sufficient stiffness to substantially resist deformation of the tubes when subjected to high frequency, low amplitude impact loading. That is, the tube will elastically deform when subjected to a continuously applied load, but will undergo substantially little or no deformation when subjected to a high frequency impact load. This combination of properties is desirable because it permits the pads to deform to permit firm gripping of the tree trunk, while at the same time the pads function as relatively rigid members to permit transfer of vibrations through the tubes onto the trunk of the tree.

When the two movable jaws 32 and 33 are moved into the position shown in FIG. 2, the adjacent longitudinal end portions of the fixed jaw 31 and movable jaws 32 and 33 contact each other and are elastically deformed. The space between the three jaws is substantially triangular, preferably a substantially equilateral triangle, except that the central portions of the inner sides of the pad and liner assemblies are also elastically deformed outwardly in conformity with the shape of the tree trunk. Thus, the tree trunk will be contacted by the jaws at three zones along its circumference and, moreover, a major portion of the circumference of the tree trunk will be contacted by the jaws 31, 32 and 33. When the movable jaws 32 and 33 are vibrated, which vibration can be imparted in a straight line direction perpendicular to the tree trunk or in a more complex gyratory pattern, because of the wide areas of contact between the jaws and the tree trunk and also because of the contact between the longitudinal end portions of the jaws with each other, the possibility of the movable jaws moving circumferentially relative to the tree trunk so as to rub the bark thereof is minimized. The possibility of damaging the tree bark is thereby substantially minimized.

Because of the fact that the pad and liner assemblies 36,46,46 have an appreciable length, e.g., from about 6 to 12 inches, the shaker mechanism can be used to shake tree trunks having diameters within a fairly wide range, e.g., from about 4 to 10 inches, while still achieving the advantageous results described above. If the diameter of the tree trunk is sufficiently large that the longitudinal ends of the pad and liner assemblies 36,46,46 do not contact each other, the extent of transverse deformation of the pad and liner assemblies will become longer, i.e., an even greater amount of the circumference of the tree will be engaged by the pad and liner assemblies, and this will provide satisfactory results.

OPERATION

The operation of the harvester constructed according to the present invention will be briefly described to ensure a complete understanding thereof.

When the harvester 11 of the present invention is to be used for harvesting fruits or nuts from a tree, the harvester 11 with the shaker mechanism 17 retained in its inward retracted position and with the movable jaws 32 and 33 in their mutually remote positions (FIG. 3) will be driven into a position disposed sidewardly of the tree so that the trunk of the tree will be disposed substantially directly adjacent the outer ends of the jaws 32 and 33 and substantially in lateral alignment with fixed jaw 31. The power cylinder 24 is then energized to cause the main frame member 19 to be moved laterally outwardly away from the side of the harvester until the trunk of the tree is disposed in the space between the jaws 32 and 33 approximately midway between the inner and outer ends thereof and in contact with fixed jaw 31. The power cylinder 24 is maintained in this extended position and power cylinders 42 are then energized to pivot the jaws 32 and 33 inwardly toward their closed positions (FIG. 2), thereby causing the jaws 32 and 33 to be moved into tight clamping engagement with the tree trunk. The cylinders 24 and 42 will then be maintained in the energized conditions to maintain the jaws 31, 32 and 33 in tight clamping engagement with the tree trunk.

After the clamping operation has been performed as described above, then one or both of the control valves on the panel 28 for controlling supply of pressure fluid to the motors 44 will be manually opened by the operator to permit pressurized fluid to be supplied to one or both of the fluid motors 44, which motors will in turn cause rotation of the eccentric weights in the housings 37. Since the motors 44 are individually controlled by their respective valves, the speeds of the motors are independent of one another and can be easily and independently varied in whatever manner desired merely by manually varying the opening of the respective control valves. Accordingly, after the shaker 17 has been clamped to the tree and the motors 44 have been energized, then the operator of the device can slowly adjust one or both of the valves, which valves can be adjusted intermittently or continuously, to permit the speeds of the motors 44 to likewise be continuously or intermittently varied, whereupon the eccentric weights can each be rotated in a widely variable pattern, including in synchronism with each other, and one faster than the other, or vice versa, with the absolute as well as the relative speeds of the two weights being variable over a wide range. The resultant vibration of the tree trunk produced by the rotating weights can therefore be of a widely variable nature, including reciprocatory, smooth gyratory or regularly or irregularly pulsed gyratory, i.e. gyratory on which is superimposed a regularly or irregularly applied radical motion. Thus, a widely variable, including random, vibration, magnitude, pattern and/or frequency can be produced due to the individual control of the variable speed motors 44. Production of the variable vibration, which is transmitted through the jaws 31, 32 and 33 onto the trunk of the tree, thus causes the fruit or nuts on the tree to be dislodged and drop into a suitable catching frame, such as the catching frames 12 and 13.

The widely variable vibration which can be produced with the shaker 17 is highly desirable because a motion of one type, e.g. reciprocatory, is not always effective in removing all the fruit from a tree because in certain zones of the tree the forces may be ineffective for dislodging the fruit from the tree. The apparatus of the present invention makes it possible to effect a wide variety of motions at selectable speeds so that all or almost all the fruit can be rapidly removed from the tree. Further, the vibration force is efficiently applied to the tree which is encircled by the jaws and is in clamped engagement therewith over the major portion of its circumference. Thus, the operator of the device can readily adjust the vibration in whatever manner desired in accordance with the rate and completeness at which the fruit is being dislodged from the tree. That is, the operator can readily observe whether the fruit is being properly dislodged from the tree and, if not, the operator can adjust the individual speeds of one or both of the motors 44 to change the shaking motion to produce a more complete dropping of the fruit. Further, such a variable vibration pattern is believed to result in a more efficient dropping of the fruit from the tree and is believed more effective in breaking the attachment between the fruit and the tree since the resultant variable vibration is multidirectional and accordingly will effectively overcome and permit dislodgement of all of the fruit. Further, such a variable vibration does not result in repetitive, identical vibration forces and thus is less apt to cause damage to the tree. Also, the variable vibration permits a large vibration force to be selectively imposed on the tree during such a short time interval that little or no damage is done to the tree.

The structure and arrangement of the jaws 31, 32 and 33 are such that the clamping force of the jaws on the tree trunk varies, depending on the diameter of the tree trunk. The clamping force becomes smaller as the tree trunk diameter is smaller because more of the clamping force is absorbed because the mechanical advantage of the movable jaws 32 and 33 becomes less as the tree trunk diameter is smaller. This is highly advantageous because the bark of smaller trees is less durable than the bark of larger trees. Thus, the jaw structure according to the invention will be less likely to harm younger trees.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which are exclusive property or privilege is claimed are defined as follows:

1. A tree shaking apparatus, comprising: a frame and mobile support means supporting said frame for movement so that said frame can be positioned adjacent to a tree; clamping means mounted on said frame for firmly gripping the trunk of the tree and shaking same, said clamping means comprising a fixed jaw and two movable jaws located on opposite sides of said fixed jaw, said fixed jaw and said two movable jaws each comprising an elastomeric pad for engaging the tree trunk, said two movable jaws being movable with respect to said fixed jaw and with respect to each other between (1) a mutually remote position wherein the elastomeric pads of said two movable jaws are spaced from the tree trunk on opposite sides thereof and (2) a mutually adjacent position wherein the elastomeric pads of said two movable jaws clamp the tree trunk against the elastomeric pad of said fixed jaw and wherein the elastomeric pad of said fixed jaw and the elastomeric pads of said two movable jaws define the sides of a substantially triangular cavity through which the tree trunk extends upwardly, first mounting means stationarily mounting said fixed jaw on said frame, second and third mounting means mounting said movable jaws on said frame for independent movement between said mutually remote position and said mutually adjacent position, separate actuating means for independently moving said two movable jaws between said mutually remote position and said mutually adjacent position and separate independently operable vibration means connected to said movable jaws for independently vibrating said movable jaws and thereby shaking the tree when said movable jaws are in said mutually adjacent position.

2. A tree shaking apparatus according to claim 1, wherein said pads comprise elongated, elastically deformable members arranged so that in said mutually adjacent position, the longitudinal end portions of said members can contact and deform each other and the regions between said end portions can be deformed into clamping engagement with the circumference of the tree trunk.

3. A tree shaking apparatus according to claim 2 wherein said members comprise elongated thick-walled tubes.

4. A tree shaking apparatus according to claim 3 wherein flexible belt-like liners extend downwardly across the upper inner side of said tubes for contact with the tree trunk.

5. A tree shaking apparatus according to claim 1 or claim 4 wherein said second and third mounting means comprises a pair of housings independently pivotally mounted on said frame, each of said housings carrying one of said movable jaws and also containing said vibration means for vibrating its associated jaw, and said actuating means comprises separate piston and cylinder assemblies, each of said assemblies being pivotally connected to one of said housings and also to said frame for moving its associated housing between said remote position and said adjacent position.

6. A tree shaking apparatus according to claim 5 including a piston and cylinder assembly connected between said frame and said support means for moving said frame sidewardly toward and away from a tree trunk.

7. A tree shaking apparatus according to claim 5 including a rotary fluid pressure operated motor on each of said housings for driving said vibration means.

8. A tree shaking apparatus according to claim 1 in which the jaws are arranged so that the clamping force becomes less as the tree trunk diameter becomes smaller.

9. A tree shaking apparatus, comprising: a frame and mobile support means supporting said frame for movement so that said frame can be positioned adjacent a tree; clamping means mounted on said frame for firmly gripping the trunk of the tree and shaking same, said clamping means comprising a fixed tubular pad made of elastomeric material and stationarily mounted on said frame and facing in a direction away from said mobile support means for engaging a portion of the circumference of the trunk of the tree, two housings respectively located on opposite sides of said fixed pad, a pair of pivot means respectively pivotally mounting said housings on said frame for independent pivotal movement in directions toward and away from said fixed pad, two piston and cylinder assemblies, each of said assemblies being connected between said frame and one of said housings so that said assemblies can independently move said housings toward and away from said fixed pad, said housings each having a wall facing said fixed pad, two movable tubular pads made of elastomeric material and fixedly mounted on said walls of said housings, respectively, so that said movable pads move with said housings toward and away from said fixed pad between (1) a mutually remote position and (2) a mutually adjacent position wherein said fixed pad and said movable pads define the sides of a substantially triangular cavity, a fluid pressure operated motor mounted on each of said housings and eccentric weight means rotatably mounted on each of said housings and connected for rotation by its associated motor to impart vibrations to said movable pads independently of each other.

* * * * *